Patented July 17, 1951

2,560,621

UNITED STATES PATENT OFFICE 2,560,621

MEAT SUBSTITUTE AND PROCESS OF MAKING SAME

Charlton L. Wrenshall, Jacksonville, Fla.

No Drawing. Application March 2, 1949, Serial No. 79,307

13 Claims. (Cl. 99—14)

This invention relates to unique food products for human consumption, and more particularly, to new and inexpensive substitutes for comminuted meat products.

It is known that in the preparation of meat substitutes having meat-like flavors, the texture and consistency of the food product are very important factors affecting the oral sensations contributing to taste. Pasty, doughy or granular products, even when containing meat flavors, fail to produce the impression of meatiness in the product.

An object of this invention is to provide meatless food products which possess in marked degree the texture, flavor, consistency and appearance characteristics of prepared comminuted meat products. A further object is to prepare meatless food products of the above characteristics having a nutrient value equal to or greater than that of meat. A still further object is to prepare meatless food products which simulate and can be substituted for or mixed with various commercial comminuted meat products, for example, country sausage, hamburger, vienna sausage, bologna, salami, luncheon loaves and the like. A still further object is to prepare meatless food products which, on the application of heat, or the addition of water and the application of heat, develop in marked degree the texture, flavor, consistency and appearance characteristics of comminuted meat products. Further objects will appear hereinafter.

I have now found that novel meatless food products closely simulating commercial comminuted meat preparations such as country sausage, hamburger, vienna sausage, bologna, salami, luncheon loaves and the like can be prepared by employing as the basic matrix a coagulated aqueous suspension of skim milk solids. This suspension may contain, for example, from about 25 to about 300 parts by weight of water for each 100 parts by weight of skim milk solids. It may be coagulated readily by heating it for a sufficient period to produce a gelled condition, for instance, by heating it to approximately 212° F. for from about 10 to about 60 minutes.

Throughout the gelled matrix is incorporated and intimately admixed a food material which acts as a texturizing agent, and also imparts body to the product. Cereals and starchy foods generally, as well as high protein cereal products in suitable form are well adapted for this purpose. The texturizing agent is preferably incorporated in the dispersion of skim milk solids prior to coagulation of the basic matrix. In addition to the texturizing agent, flavoring and coloring ingredients can be included in the composition and are generally added prior to coagulation of the matrix. Other well known food additives may be employed, such as vegetable gums for thickening, fats to prevent drying out, meats and the like. These products may be pre-cooked or not, as desired.

The basic ingredient of my novel meat substitutes is non-fat dry milk solids. These solids consist principally of the proteins, carbohydrates and minerals found in milk. From 36 to 40% of these milk solids is protein of nutritional efficiency equal to that of meat protein. In the novel meat substitutes of this invention the high quality protein is present in approximately the same proportion as protein in average cuts of meat. Water is added to the non-fat milk solids in proportions from 25 to 300% by weight of the non-fat dry milk solids. The resulting aqueous suspension is coagulated to produce the matrix of my product. Air is trapped in the coagulated matrix and provides a finished product which is particularly advantageous from the standpoint of texture. It is possible to control the amount of air included in the coagulum by preheating the non-fat milk solids or the mixture containing it below the coagulation temperature prior to the final heat coagulation. It has been observed that non-fat milk solids which were processed at relatively low temperatures can be coagulated more readily than those processed at high temperatures.

Texturizing agents such as starchy or proteinaceous natural food materials, which are incorporated with the coagulum of skim milk solids to simulate meat-like texture include sweet potato, Irish potato, corn meal, hominy grits, farina, rice, tapioca, starch sponge, wheat bran, wheat shorts, prepared cereal foods, soya grits, cereal meal, skim milk curds and the like. They are added in amounts of 5% to 100% by weight of the milk solids. These materials are comminuted where necessary to appropriate particle sizes for the purpose of simulating the texture of ground meat products. Particles having diameters of less than ⅛ inch are generally suitable for this purpose and are employed in preparing the products of the invention.

It has been found advisable in some instances to add to the initial ingredients a small proportion i. e. from .2% to 1.0% by weight based on the skim milk solids, of a vegetable gum of high water absorbency, for example, carboxymethylcellulose, sodium alginate, carageenin and the like. The use of these vegetable gums along with the initial ingredients serves to thicken the mixes and prevent the denser particles from settling out prior to coagulation.

In the preferred method of preparing the simulated meat products of this invention, the non-fat dry milk solids are mixed with the desired proportion of texturizing agent in the presence of a predetermined amount of water, flavor and coloring matter. When all ingredients are thoroughly incorporated in the mixture, it is heated at a sufficiently high temperature and for a sufficient time to coagulate the non-fat dry milk solids and produce the meatless food product which possesses the texture, flavor, and appearance of the particular comminuted meat product which it is desired to simulate.

In an alternative method of preparing the simulated meat products of this invention the basic matrix is formed by heat coagulating an aqueous suspension of non-fat dry milk solids and incorporating therein the texturizing, flavoring and coloring ingredients, or other additives by means of a suitable mixing apparatus until all ingredients are thoroughly blended.

In another method of preparing products of this invention, the ingredients may be mixed together and distributed to consumers in the wet or dry form prior to cooking.

In still another method of preparing products of this invention the dry ingredients may be mixed together and distributed to the consumer, in which case the product is only semi-perishable and may be stored for considerable lengths of time prior to the addition of water and cooking.

In the heat coagulation procedures cooking temperatures from 200° F. to 400° F. can be employed depending on the cooking method used. For example, an oven temperature of about 350° F. has been found to be generally satisfactory. The time of heating varies with the temperature employed and also with the size of the batch, but generally from 25 minutes to 60 minutes is sufficient to produce a satisfactory coagulum from the non-fat dry milk solids.

Mixing of the essential ingredients of the food preparation can be accomplished in conventional mixing apparatus, for example, in stirred kettles, by passage through food mills, or by any other convenient means for thoroughly mixing these ingredients. The heating can be accomplished either in separately heated open or closed vessels or in ovens.

The following typical formulas, in which parts are by weight, produce food products which simulate comminuted meat products of the type designated.

Vienna sausage type 100 parts non-fat dry milk solids
25 parts potato
50 parts water
4 parts salt
Suitable commercial flavor and color.

The mixture is cooked in suitable moulds to resemble vienna sausage.

Ground meat type 120 parts non-fat dry milk solids
80 parts potato
4 parts salt
4 parts sausage seasoning
Color to suit.
Cooked at 350° F. to firm consistency and chopped with 25 parts vegetable shortening.

Loaf using butter or oleomargarine 100 parts non-fat dry milk solids
50 parts potato
75 parts water
6 parts vegetable protein hydrolysate
6 parts animal protein hydrolysate
6 parts onion
20 parts butter or oleomargarine
5 parts flour
Color to suit.

The product is baked or autoclaved at 350° F. in loaf pans.

Loaf using cereal meal 100 parts milk solids
50 parts cereal meal (soy meal, gluten meal, graham meal)
75 parts water
Fat, seasoning and color to suit.

The product is baked or autoclaved at 350° F. in loaf pans.

Canned meat type 100 parts non-fat dry milk solids
75 parts water
5 parts vegetable protein hydrolysate
6 parts onion
10 parts vegetable oil
5 parts hydrogenated oil
3 parts salt
50 parts skim milk curd
0.3 part vegetable gum
Color to suit.

The product is precooked, and the mixture is packed in cans and processed at 350° F. in an autoclave.

Bologna type 25 parts potato
104 parts water
100 parts non-fat dry milk solids
3 parts vegetable gum
4 parts salt
2.2 parts commercial bologna seasoning
Color to suit.

Luncheon loaf 100 parts potato
100 parts non-fat dry milk solids
25 parts water
10 parts fat
10 parts onion
6 parts sugar
3 parts salt
0.3 part spice mixture The product is baked in loaf pans or cooked at 350° F., and then pressed into leaves.

General purpose dry mix for baked loaf, etc.

100 parts non-fat dry milk solids
20 parts rice
6 parts vegetable protein hydrolysate
2.5 parts dehydrated onion
20 parts hydrogenated vegetable oil
0.2 part seasoning
0.6 part vegetable gum In the above described general purpose dry mix 90 to 100 parts of water is added prior to heating to give a product of suitable consistency.

In some of the foregoing exemplary formulas fats have been incorporated as a desirable nutritional additive and to assist in maintaining the desired product consistency. Fats tend to soften the finished product, to retard drying out and to provide a more bland flavor. Useful fats include vegetable oils, hydrogenated vegetable oils, lard, oleomargarine, butter and commercial powdered shortening. These may be used interchangeably and in varying proportions.

In some instances it is desirable to substitute a fluid aqueous food product such as milk for all or part of the water in the suspension prior to cooking.

The basic flavoring ingredients employed are hydrolysates of various proteins including vegetable proteins, yeast proteins and animal proteins. Commercial preparations of these products usually contain salt and the amount of salt used in addition must be controlled accordingly. Pepper, other spices, and various commercial flavoring preparations containing natural and artificial flavors may be incorporated so as to produce in the finished products the flavors characteristic of various well known commercial meat products, such as, for example, bologna, vienna sausage, liverwurst, luncheon meat loaves, frankfurters, etc.

Coloring compositions such as those certified by the United States Food and Drug Administration for use in food materials are used to produce appropriate colors in the finished products.

The meatless food products of this invention may be distributed as cooked, ready-to-eat products in the form similar to and in the same manner as well known commercial comminuted meat products. The products can be placed in cans and processed in conventional manner to resemble canned meat products. Precooked, they may be formed into sausages or pressed into conventional sandwich loaves and the like. Uncooked, they may be distributed as wet mixes which require suitable cooking and as dry mixes which require the addition of water or fluid milk and cooking to prepare them for final consumption.

Although the products of this invention are primarily for use as substitutes for comminuted meat products, they may also be used as extenders for meat in such products. However, in the products of my invention a definite meat-like character is developed without any meat whatsoever being used.

As many apparently widely different embodiments of this invention may be made without departing from the spirit and scope hereof, it is to be understood that the invention is not limited to the specific embodiments hereof, except as defined in the appended claims.

I claim:

1. An edible food product comprising essentially a mixture of particles of an edible solid texturizing agent and dried milk solids, said particles having sizes that impart to the mixture upon gelling of the milk solids, a texture corresponding to that of comminuted meat preparations.

2. An edible food product comprising essentially a coagulum of dried non-fat milk solids having intimately admixed therewith particles of an edible solid texturizing agent, said particles having sizes that impart to the mixture a texture corresponding to that of comminuted meat preparations.

3. An edible food product which has a meat-like character, said product comprising essentially a coagulum of dried non-fat milk solids in water, said coagulum having intimately admixed therewith particles of an edible solid proteinaceous texturizing agent, said particles having sizes that impart to the mixture a texture corresponding to that of comminuted meat preparations, and coloring and flavoring ingredients to impart a meat-like color and flavor to the mixture.

4. An edible food product which has a meat-like character, said product comprising essentially a coagulum of dried non-fat milk solids having intimately admixed therewith skim milk curd particles having sizes that impart to the mixture a texture corresponding to that of comminuted meat preparations, and coloring and flavoring ingredients to impart a meat-like color and flavor to the mixture.

5. A process for preparing an edible food product resembling comminuted meat preparations which method comprises heating an aqueous suspension of dried non-fat milk solids until a coagulum of the skim milk solids is formed, and mixing with the milk solids an edible solid texturizing agent in the form of particles having sizes that impart to the final product a comminuted meat-like texture.

6. The product as defined by claim 1 in which the texturizing agent is present in an amount of about 5 to 100% of the milk solids by weight.

7. The product as defined by claim 1 in which the texturizing particles are less than one-eighth inch in size.

8. The product as defined by claim 1 in which the texturizing agent is selected from the class consisting of potatoes, grits, farina, rice, tapioca, starch sponge, bran, wheat shorts, cereal meal, and skim milk curds.

9. The product as defined by claim 2 in which the coagulum is in the form of a matrix containing trapped air.

10. The product as defined by claim 2 in which the mixture includes water in an amount of about 25 to 300% by weight of the skim milk solids.

11. The process as defined by claim 5 in which the mixing is effected after the coagulum is formed.

12. The process as defined by claim 5 in which the mixing is effected before the coagulum is formed.

13. The process as defined by claim 5 in which the heating is effected at a temperature between about 200° and 400° F.

CHARLTON L. WRENSHALL.

REFERENCES CITED

The following references are of record in the file of this patent:

UNITED STATES PATENTS

| Number | Name | Date |
|---|---|---|
| 2,101,633 | Whitaker et al. | Dec. 7, 1937 |
| 2,155,417 | Griffith | Apr. 25, 1939 |

FOREIGN PATENTS

| Number | Country | Date |
|---|---|---|
| 22,787 | Great Britain | A. D. 1909 |

OTHER REFERENCES

"The Meat Flavor," by Max Salomon, Food Manufacture, March 1943, pages 91 and 92.